United States Patent [19]
Berklich, Jr. et al.

[11] Patent Number: 4,759,580
[45] Date of Patent: Jul. 26, 1988

[54] BENCH SEAT FLOOR LATCHING MECHANISM

[75] Inventors: Louis W. Berklich, Jr., Rochester; Richard A. Furst, St. Clair Shores; David W. Husted, Ann Arbor, all of Mich.

[73] Assignee: Hoover Universal, Inc., Ann Arbor, Mich.

[21] Appl. No.: 70,436

[22] Filed: Jul. 6, 1987

[51] Int. Cl.⁴ .................................................. B60N 1/02
[52] U.S. Cl. ................................ 296/65 R; 297/336; 248/503.1; 292/31; 292/DIG. 72
[58] Field of Search ............... 296/63, 65 R, 65 A; 297/331, 336, 379, 15; 248/503.1; 292/24, 31, 44, 54, DIG. 22

[56] References Cited

U.S. PATENT DOCUMENTS

| | | | |
|---|---|---|---|
| 4,194,782 | 3/1980 | Itoh | 296/65 R |
| 4,218,074 | 8/1980 | Crawford | 280/801 |
| 4,408,798 | 10/1983 | Mizushima et al. | 296/65 R X |

Primary Examiner—Dennis H. Pedder
Attorney, Agent, or Firm—Harness, Dickey & Pierce

[57] ABSTRACT

A floor latching mechanism particularly adapted for attaching a bench seat to a motor vehicle floor which permits the seat to be conveniently removed from the vehicle. The floor latching mechanism includes a retractable actuation handle which drives a pair of hooks that are engageable with shafts attached to the motor vehicle floor. When the actuation handle is rotated, a cam partially lifts the bench seat and maintains the hooks out of engagement with the floor shafts. The floor latching mechanisms may be actuated to a parked position wherein the mechanism will not inadvertently reengage the floor shafts.

11 Claims, 4 Drawing Sheets

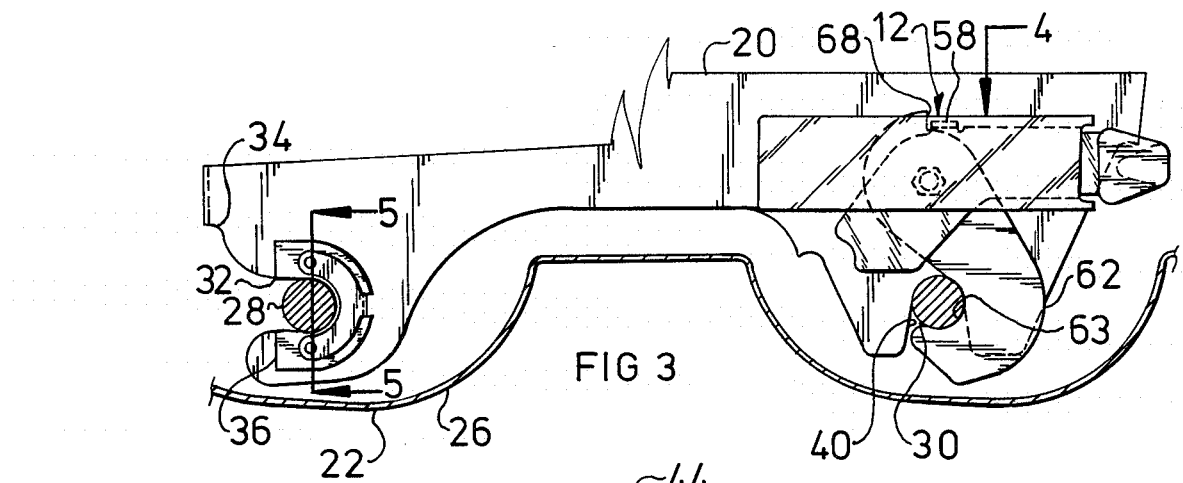
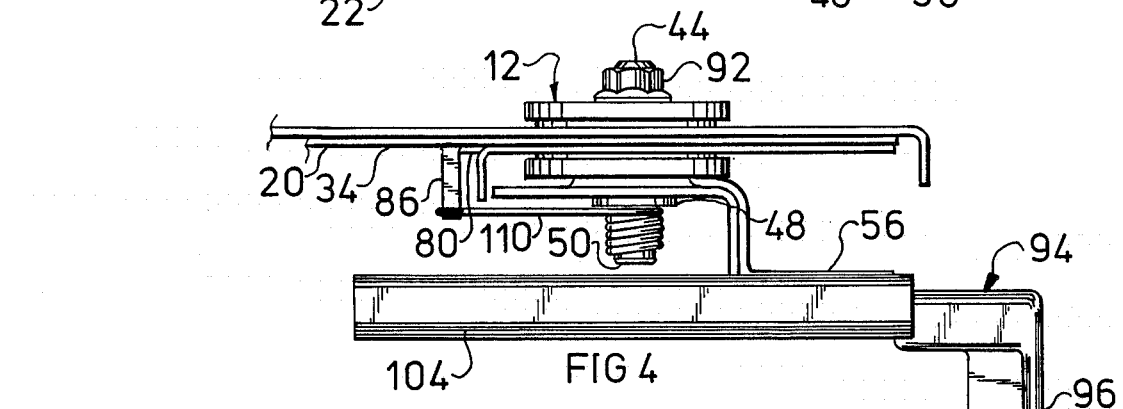
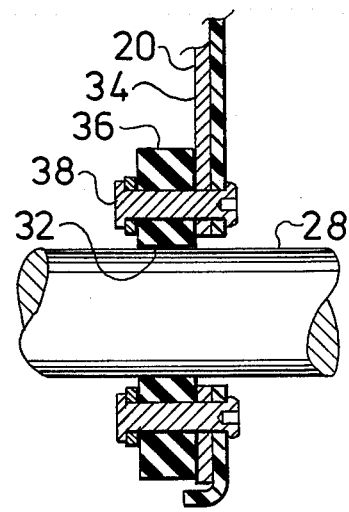

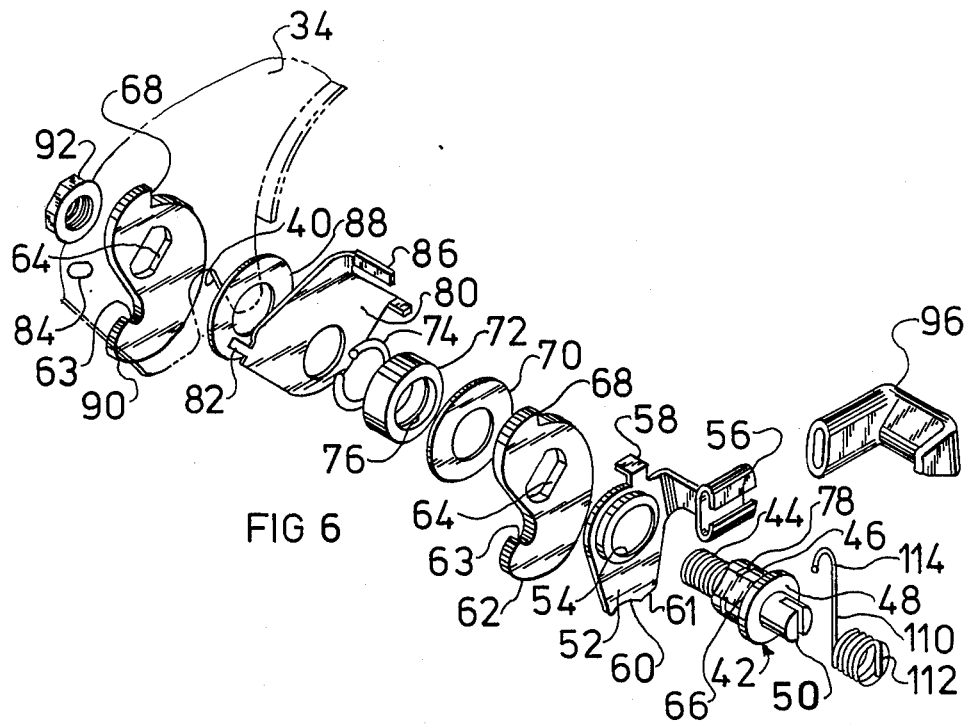
FIG 6
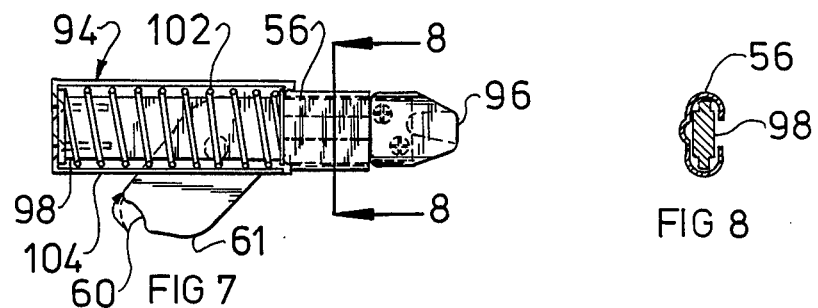
FIG 7
FIG 8
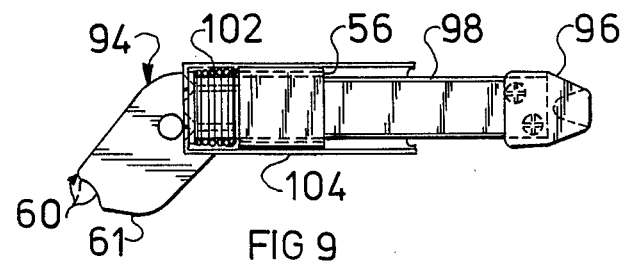
FIG 9

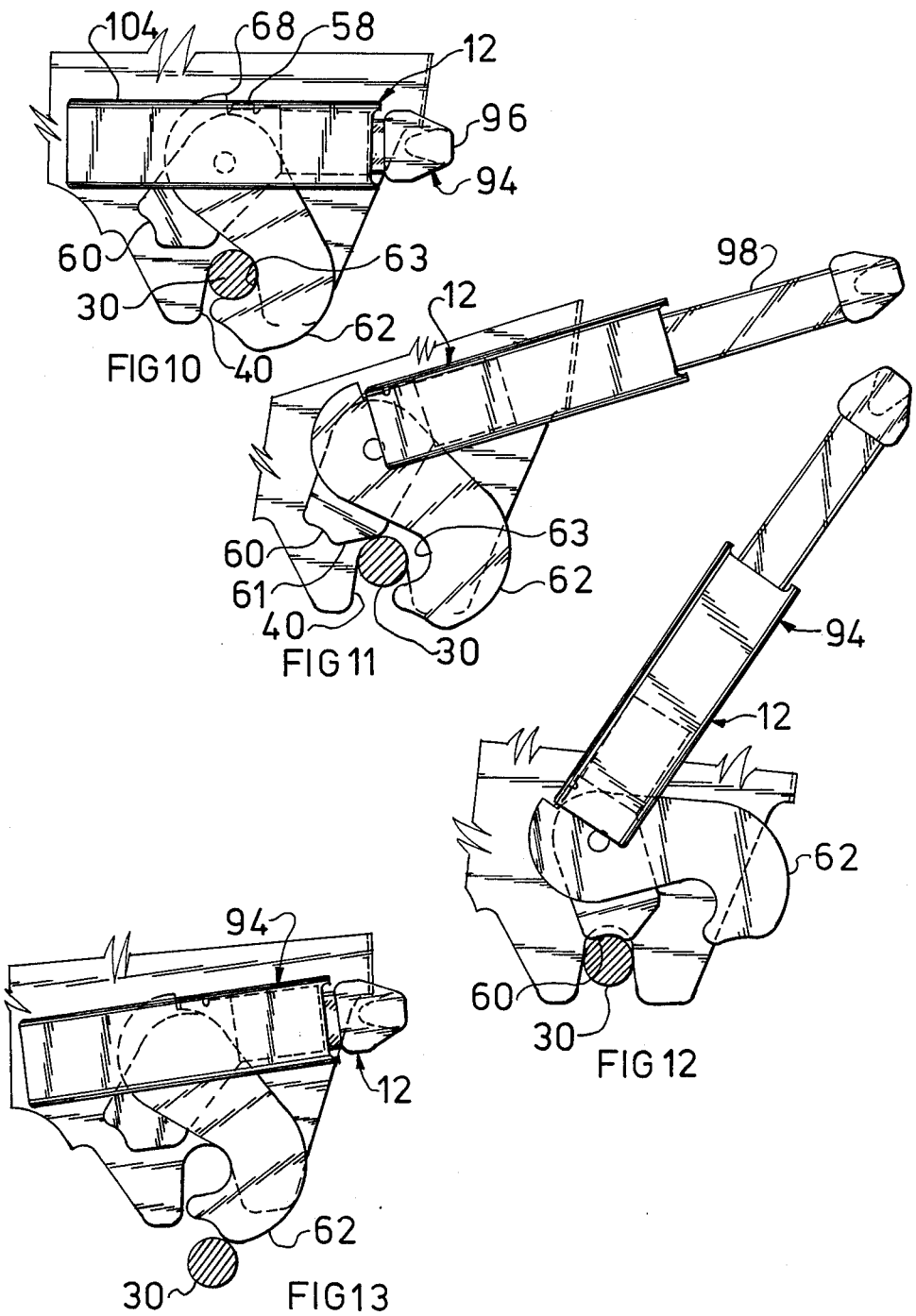

BENCH SEAT FLOOR LATCHING MECHANISM

BACKGROUND OF THE INVENTION

This invention relates to a latching mechanism and particularly to one adapted for mounting removable bench seats to a motor vehicle.

Modern passenger carrying vans and other multipurpose passenger vehicles are frequently equipped with bench seats which are removable to permit varied uses of the vehicle. With one or more bench seats installed, the vehicles can be used to carry a number of occupants or may be removed to enable the vehicle to transport large objects such as furniture, building materials, etc.

Present motor vehicle safety standards require vehicle bench seats to be equipped with seat belt systems. In the event of vehicle impact, extreme loads are tranferred from the seat belts to the seat structure, and the seat may be further subjected to loads due to occupants or objects striking the seat. As an occupant protection measure, it is desirable to maintain the bench seat securely fastened to the vehicle structure during collision. Accordingly, the fastening system used to attach the bench seat to the vehicle floor must be capable of transmitting high force loadings. While threaded fasteners can be used to mount a bench seat to the vehicle floor, most manufacturers offer mechanisms which are designed to enable rapid removal and replacement of the seats without requiring the use of tools.

Conventional motor vehicle bench seats have a pair of laterally separated supporting pedestals. In order to provide acceptable securement of the seat, it is necessary for each of the pedestals to be anchored to the vehicle floor. Accordingly, if the seat is to be easily removeable, a latching mechanism is required for each of the pedestals. As a convenience feature, the latching mechanisms associated with each of the pedestals could be released siumultaneously by coupling on to the other by remote control torsion rods, cables, etc. This approach, however, requires a significant amount of additional hardware and may impose packaging restrictions and cost penalties. Due to the disadvantages of providing remote control for the latching mechanisms, these units are typically independently releasable. This approach however, suffers the disadvantage that frequently, when one floor latch is released and the user approaches the other latch, the first latch becomes inadvertently refastened. The user therefore, must attempt to simultaneously release both latching mechanisms, or push on the seat after releasing one latch to prevent it from inadvertently reengaging.

In view of the foregoing, it is desirable to provide a seat latching mechanism which avoids the complexity of remote control release while preventing inadvertent reengagement of the latch mechanisms after they are released. It is further desired to provide such a mechanism which provides acceptable structural integrity and is conveniently operable by a user.

SUMMARY OF THE INVENTION

The bench seat floor latching mechanism in accordance with this invention achieves the above-mentioned desirable features. The mechanism includes rotatable hooks which engage floor mounted support shafts. The hooks are rotated by a telescoping actuation handle between released and secured positions. A cam is provided which rotates with the hook during release and supports the bench seat pedestal in a slightly elevated position which prevents inadvertent relatching of one of the latching mechanisms while the other mechanism is released.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a partial side elevational view taken in the direction of arrow 3 shown in FIG. 1 showing the seat pedestal and features of the vehicle floor.

FIG. 4 is a top view of the component shown in FIG. 3 taken in the direction of arrow 4 of that Figure.

FIG. 5 is a cross-sectional view taken along line 5—5 of FIG. 3, particularly showing engagement between the front floor shaft and the bench seat pedestal.

FIG. 6 is an exploded pictorial view showing the components of the latching mechanism according to this invention.

FIG. 7 is a partial side view showing the retractable actuation handle assembly of the floor latching mechanism according to this invention.

FIG. 8 is a cross-sectional view taken along line 8—8 of FIG. 7.

FIG. 9 is a side elevational view of the actuation handle assembly shown in an extended actuating position.

FIG. 10 is a side elevational view showing the floor latching mechanism in a secured condition.

FIG. 11 is a side elevational view showing the floor latching mechanism being released.

FIG. 12 is a side elevational view showing the floor latching mechanism in a released and parked condition.

FIG. 13 is a side elevational view showing the floor latching mechanism in a released condition.

DETAILED DESCRIPTION OF THE INVENTION

Figure 1:
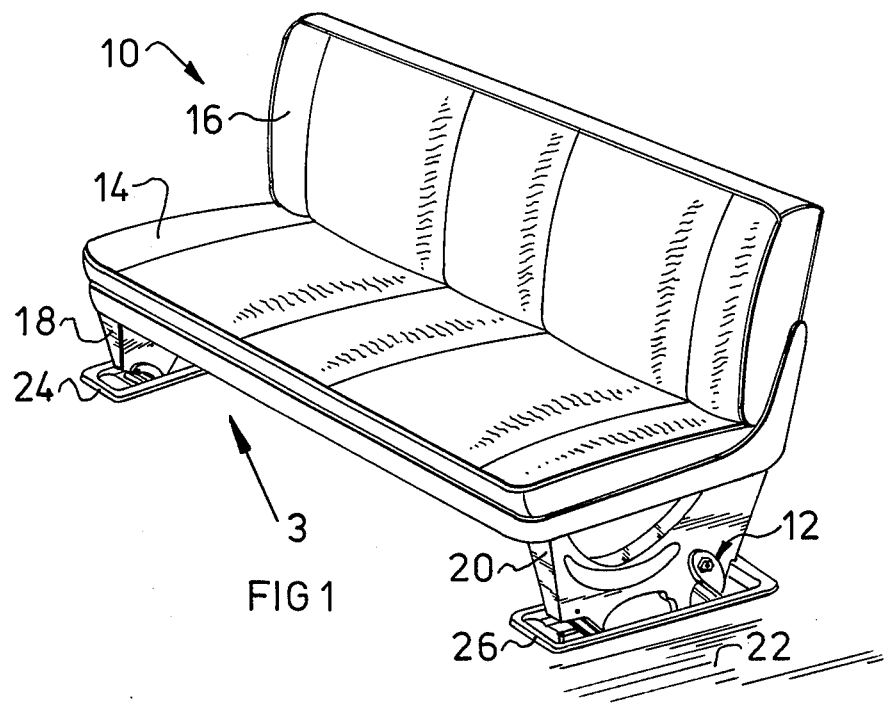
FIG. 1 is a pictorial view of a bench seat including the floor latching mechanism in accordance with this invention shown in a secured position within a motor vehicle.
Figure 2:
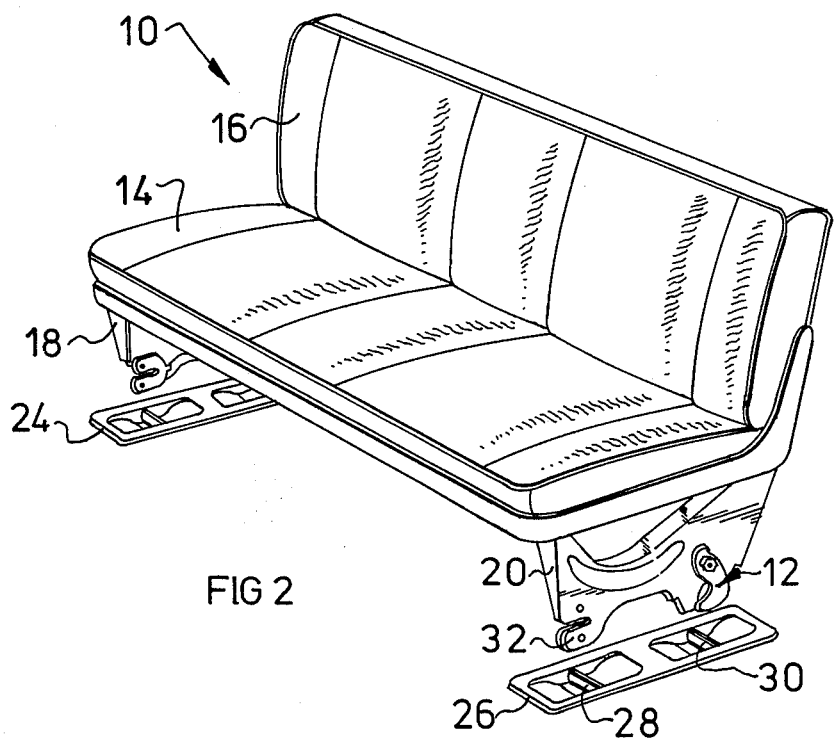
FIG. 2 is a pictorial view of the bench seat shown in FIG. 1 released from the associated motor vehicle floor.

FIGS. 1 and 2 show bench seat 10 of a type with which the floor latching mechanism according to this invention may be used which is generally designated by reference number 12. Bench seat 10 is of conventional design having a cushion portion 14 and a seat back portion 16. Bench seat 10 is supported by a pair of laterally separated pedestals 18 and 20. Bench sat 10 is removably coupled to vehicle floor 22 which has a pair of laterally separated mounting sockets 24 and 26 which are positioned in registry with pedestals 18 and 20. FIG. 1 shows bench seat 10 in a secured condition and FIG. 2 shows the seat released from mounting sockets 24 and 26.

Each of mounting sockets 24 and 26 include a pair of separated floor shafts 28 and 30 which extend laterally with respect to the vehicle. Floor shafts 28 and 30 are preferably embedded below the surface of floor 22 such that when bench seat 10 is removed, they are unobtrusive and do not interfere with loading and unloading of the vehicle.

Bench seat pedestals 18 and 20 each have a forward opening floor shaft receiving notch 32. As shown in FIG. 5, notch 32 is formed within pedestal plate 34. An elastomeric damper 36 is provided which engages floor shaft 28 and is held in position by fasteners 38. Damper 36 is compressed slightly when bench seat 10 is installed and acts to dampen vibrations and prevent rattling.

Floor latching mechanisms 12 are provided for each of pedestals 18 and 20 and are detachably coupled to floor shafts 30. This arrangement permits bench seat 10 to be installed by first engaging floor shafts 28 with notches 32, and thereafter rotating the seat until the latching mechanisms engage floor shafts 30.

With particular reference to FIG. 6, the components of floor latching mechanism 12 are shown in detail. Pedestal plate 34 defines notch 40 which is positioned in registry with floor shaft 30 when bench seat 10 is in the secured position. Main pivot 42 includes threaded end 44, cylindrical portion 46, shoulder 48, and slotted end 50. Handle bracket 52 is journalled onto cylindrical portion 46 about bore 54, and is rotatable with respect to main pivot 42. Handle bracket 52 includes an arm forming a "C"-shaped handle retainer 56, projecting tab 58, arcuate cam surface 60, and inclined surface 61. First hook 62 is loaded onto cylindrical portion 46 and includes hook notch 63 and an internal bore with driving surface 64 which engages a similarly shaped driving surface 66 formed by main pivot cylindrical portion 46. The provision of driving surfaces 64 and 66 cause hook 62 to be rotationally coupled to main pivot 42. Hook 62 further includes a radially projecting wall surface 68 which is driven by handle bracket tab 58 to cause the hook to rotate, as will be explained more completely below. Also loaded onto main pivot 42 is spacer 70, bushing 72, and bushing retainer ring 74. Bushing retainer ring 74 is snapped into bushing groove 76 and engages main pivot groove 78 to maintain bushing 72 on main pivot 42. Main pivot 42 also passes through plate 80 having a projecting locating lug 82 which fits into pedestal locating hole 84 to prevent the plate from rotating relative to the pedestal plate 80, and further includes spring engaging arm 86. On the opposite side surface of pedestal plate 34 is spacer 88 and a second hook 90.

Second hook 90 is identical in configuration to hook 62 and also includes driving surface 64, notch 63 and wall 68. Nut 92 is threaded onto main pivot end 44 to retain the above described components in an assembled condition loaded onto main pivot 42. The entire assembly is freely rotatable with respect to pedestal plate 34.

The details of actuation handle assembly 94 are best described with reference to FIGS. 7 through 9. Assembly 94 includes a projecting handle end 96 which is affixed to slide bar 98 by threaded fasteners or other attaching means. Slide bar 98 is slidable within handle retainer 56. Coil spring 102 surrounds slide bar 98 and engages one end of handle retainer 56. The opposite end of spring 102 is supported by spring cover 104 which is affixed to the end of slide bar 98 by threaded fasteners (as shown) or other attaching means. Spring cover 104 enclosed spring 102 to hide it from view and provides protection against contamination. Actuation handle 94 is normally retained in the retracted position shown in FIG. 7 by the biasing exerted by spring 102. When a user desires to rotate handle bracket 94 to release the seat, handle 96 is extended causing spring 102 to compress which increases the leverage the user can exert on handle bracket 52. When the operator releases handle 96, slide bar 98 retracts to its normal position as shown in FIG. 7 so that the handle is maintained in an unobtrusive state.

Handle torsion spring 110 includes an inner end 112 which is received by slotted main pivot end 50, and has radially projecting end 114 which engages plate spring engaging arm 86. Handle torsion spring 110 biases main pivot 42 and hooks 62 and 90 in the clockwise direction, with respect to the orientation of the component shown in FIGS. 3 and 9 through 13. Handle torsion spring 110 does not, however, exert a biasing load directly upon handle bracket 54, since the bracket is freely rotatable with respect to main pivot 42 through a predetermined range of lost motion.

Operation of floor latching mechanism 12 will now be described with particular reference to FIGS. 10 through 13, FIG. 10 illustrates the normal positioning of floor latching mechanism 12 when it is secured to floor shaft 30, thereby locking bench seat 10 to floor structure 22. When the user desires to remove bench seat 10, handle end 96 is extended and rotated in a counterclockwise direction. A predetermined range of angular lost motion is provided during initial rotation of handle assembly 96 until tab 58 engages hook walls 68. At this point, hooks 62 and 90 are rotatably driven such that hook notches 63 disengage floor shaft 30. After hooks 62 and 90 are rotated slightly, as shown in FIG. 11, inclined surface 61 acts on floor shaft 30 to lift bench seat 10 slightly. Finally, the floor shaft 30 becomes nested into arcuate cam surface 60, as shown in FIG. 12. In this "parked" position, the weight of bench seat 10 and the contours of floor shaft 30 and cam surface 60 maintain actuation handle assembly 94 in the rotated position shown in FIG. 12.

When handle assembly 94 is in the parked position, hooks 62 and 90 are maintained out of engagement with floor shaft 30 since they are driven against spring tension by tab 58 acting on walls 68. When one of the two latching mechanisms associated with the separated pedestals 18 and 20 is put into the parked position, the other mechanism is thereafter similarly actuated. Once both of the latching mechanisms 12 are placed in the condition shown in FIG. 12, bench seat 10 can be removed by rotating it forwardly about front floor shafts 28. When bench seat 10 is raised thus disengaging cam surface 60 from floor shaft 28, the rotational biasing exerted by torsion spring 110 causes the latching mechanism components to return to their normal position, as shown in FIG. 13. The entire bench seat mechanism 10 may thereafter be removed from the vehicle.

In order to reengage bench seat 10 with vehicle floor 22, the seat is first positioned so that pedestal notches 32 engage floor shafts 28, and then the seat is rotated rearwardly. As shown in FIG. 13, hooks 62 and 90 engage floor shafts 30 and are caused to rotate in a counterclockwise direction against the spring force exerted by torsion spring 110. Continued downward movement of the bench seat causes hooks 62 and 90 to latch into engagement with floor shafts 30.

While the above description constitutes the preferred embodiments of the present invention, it will be appreciated that the invention is susceptible to modification, variation and change without departing from the proper scope and fair meaning of the accompanying claims.

What is claimed is:

1. A floor latching mechanism for removably coupling a seat to a vehicle structure having at least one engagement feature coupled to said vehicle comprising:

a main pivot carried by said seat, a handle bracket carried by said main pivot and rotatable with respect to said seat, an actuation handle coupled to said handle bracket, cam means coupled to said handle bracket and engageable with said engagement feature, and a hook carried by said main pivot and engageable with said engagement feature, said hook coupled to said handle bracket and rotatable with respect to said seat, wherein when said hook engages said engagement feature, said seat is secured to said vehicle structure, and when said handle is actuated to cause rotation of said handle bracket and said hook, said hook disengages said engagement feature and said cam means engages said engagement feature to maintain said hook out of engagement with said engagement feature, thereby preventing inadvertent reengagement of said hook with said engagement feature.

2. A floor latching mechanism according to claim 1 further comprising first spring means for rotatably urging said hook into engagement with said engagement feature.

3. A floor latching mechanism according to claim 1 wherein said cam means is formed by said handle bracket.

4. A floor latching mechanism according to claim 1 wherein said handle bracket defines a tab which engages a wall of said hook to permit a predetermined degree of lost rotational motion of said handle bracket before said tab drives said hook for rotation.

5. A floor latching mechanism according to claim 1 further comprising means for enabling said handle to be maintained in a normal retracted position and extended to an actuation position enabling increased torque to be applied to said handle bracket.

6. A floor latching mechanism according to claim 1 wherein said seat includes means for engaging a second engagement feature affixed to said vehicle structure.

7. A floor latching mechanism according to claim 1 wherein said engagement feature is comprised of a shaft affixed to the floor structure of a vehicle.

8. A floor latching mechanism for removably coupling a seat to a motor vehicle floor, said seat of the type having a pair of laterally separated pedestals with one of said floor latching mechanisms carried by each of said pedestals, and said floor structure having at least one floor shaft affixed to said floor structure, each of said latching mechanisms comprising;

a main pivot carried by said pedestal and journalled for rotation therewith, a handle bracket journalled onto said main pivot and having a projecting tab, and defining an arcuate shaped cam surface engagable with said floor shaft, a hook carried by said main pivot and coupled thereto for mutual rotation, said hook having a notch engagable with said floor shaft and further defining a wall engagable with said handle bracket tab, an actuation handle coupled to said handle bracket for rotating said handle bracket, spring means acting on said main pivot for biasing said hook toward engagement with said floor shafts wherein, when said hook notch is in engagement with said floor shaft, said seat is secured to said floor structure, and when said handle bracket is rotated by said actuation handle, said arcuate shaped cam surface is moved toward engagement with said floor shaft and said tab engages said wall to urge said hook to rotate out of engagement with said floor shaft, and wherein when said arcuate shaped cam surface engages said floor shaft, said hook notch is maintained out of engagement with said floor shaft thereby preventing inadvertent reengagement of said hook with said floor shaft.

9. A floor latching mechanism according to claim 8 further comprising means for enabling said handle to be maintained in a normal retracted position enabling increased torque to be applied to said handle bracket.

10. A floor latching mechanism according to claim 8 wherein said handle bracket further defines an inclined ramp surface which engages said floor shaft to lift said bench seat as said handle bracket is rotated toward a position wherein said arcuate shaped cam surface engages said floor shaft.

11. A floor latching mechanism according to claim 8 wherein said pedestal includes means for engaging a second floor shaft affixed to said floor.

* * * * *